United States Patent [19]

Daniels

[11] 4,334,380
[45] Jun. 15, 1982

[54] TROLLING RIG

[76] Inventor: Dennis Daniels, Quilecene, Wash.

[21] Appl. No.: 13,318

[22] Filed: Feb. 21, 1979

[51] Int. Cl.³ .......................................... A01K 89/015
[52] U.S. Cl. .................................... 43/27.4; 242/106;
   242/84.1 R; 254/300; 242/215
[58] Field of Search .................... 43/20, 27.4, 6.5, 4,
   43/43.12; 242/96, 106, 100.1, 212–216, 84.18,
   17–19; 254/300, 366

[56] References Cited
U.S. PATENT DOCUMENTS

| | | | |
|---|---|---|---|
| 2,648,506 | 8/1953 | Kirby | 242/218 |
| 2,765,990 | 10/1956 | Engel | 242/216 |
| 3,008,259 | 11/1961 | Zornes | 43/43.12 |
| 3,355,835 | 12/1967 | Lyons | 43/27.4 X |
| 3,478,977 | 11/1969 | Sarah | 242/219 X |
| 3,484,978 | 12/1969 | Nakashima | 43/27.4 |
| 3,937,415 | 2/1976 | Prinz | 43/27.4 X |
| 3,942,737 | 3/1976 | Luzi | 242/106 X |
| 3,961,437 | 6/1976 | Lewis | 43/27.4 |
| 3,967,405 | 7/1976 | Henze | 43/27.4 |
| 3,968,587 | 7/1976 | Kammeraad | 43/27.4 |
| 4,129,273 | 12/1978 | Hill | 242/100.1 X |

Primary Examiner—Nicholas P. Godici
Assistant Examiner—Robert P. Olszewski
Attorney, Agent, or Firm—Seed, Berry, Vernon & Baynham

[57] ABSTRACT

A trolling rig has a base upon which is mounted a pair of drums and a pair of telescopic booms. A pair of handles are selectively engageable individually or simultaneously with the drums to wind in line from the booms.

7 Claims, 4 Drawing Figures

U.S. Patent     Jun. 15, 1982     4,334,380
FIG. 1
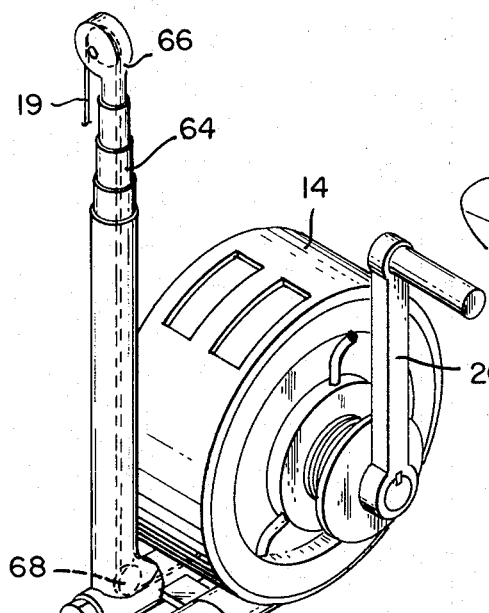
FIG. 3
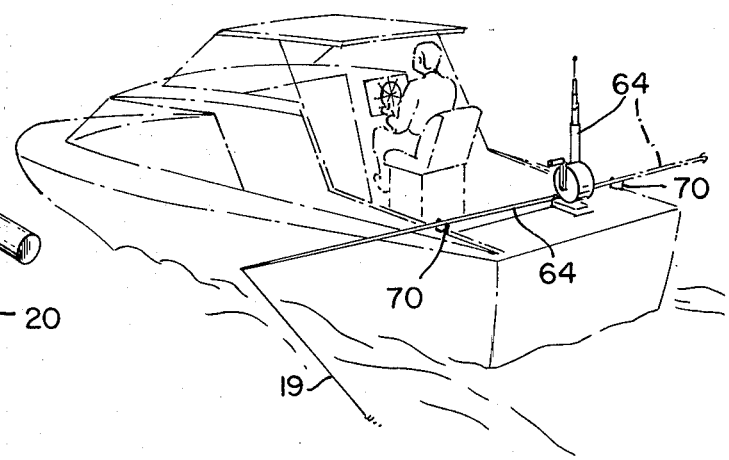
FIG. 2
FIG. 4
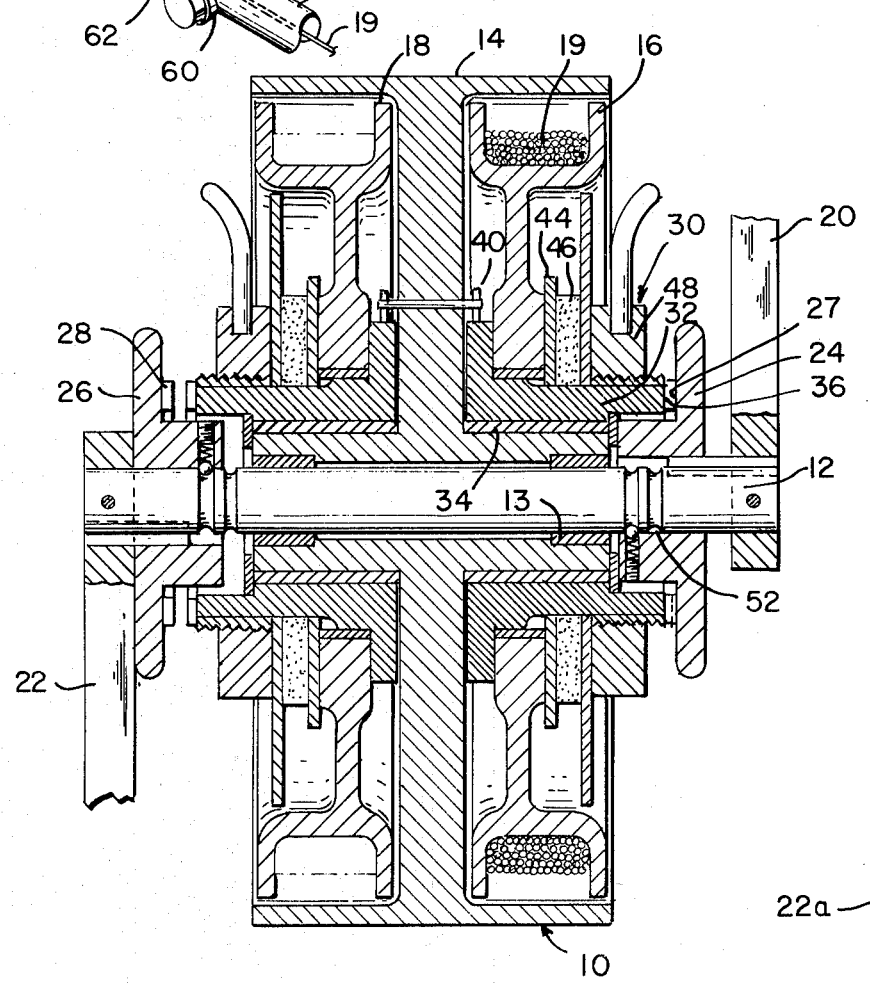

TROLLING RIG

BACKGROUND OF THE INVENTION

1. Field of the Invention

This invention pertains to deep trolling rigs or fishing windlasses in which a pair of heavy downrigger or weight lines can be positioned laterally and lowered from opposite sides of the boat through a single trolling rig windlass.

2. Description of the Prior Art

Trolling rigs of the manual type have generally consisted of a single drum windlass. These trolling rigs are then positioned on the boat adjacent a gunwale so that the heavy weight line can be positioned out over the side of the boat into the water. If more than one manual deep trolling rig is employed, it has required that each be located on a separate gunwale. Individual manual trolling rigs of this nature are expensive and can interfere with docking or boarding the boat if positioned on a gunwale.

SUMMARY OF THE INVENTION

It is an object of this invention to provide a dual boom trolling rig which can be positioned centrally in a boat and operative to handle two downrigger lines either simultaneously or individually.

It is another object of this invention to provide an improved trolling rig which can use an efficient dual handled windlass drive to separately operate one of two windlasses or both windlasses simultaneously.

It is still another object of this invention to provide a deep trolling rig which is convenient to use and easily stored away from the actively used areas of a boat.

Basically, these inventions include a base which can be mounted preferably on the center line of a boat and which rotatably mount a pair of drums holding suitable downrigger or weight lines. The drums are selectively coupled to a common crankshaft which is rotated by a pair of handles. Booms or poles are attached to the base by boom sockets which are pivotally connected from a vertical stowed position to laterally extending use positions. Preferably the booms are telescopically extendible.

The advantages of the invention are that with a single windlass mechanism two lines can be operated either singly or simultaneously. The fisherman can thus save time in pulling in only one weight line for attaching a fishing line or can raise both weight lines simultaneously when encountering bottom obstructions, changing all baits, etc. The poles are readily stowed in a location which is not generally accessible to passengers on the boat.

BRIEF DESCRIPTION OF THE FIGURES OF THE DRAWING

FIG. 1 is a fragmentary isometric of the trolling rig embodying the principles of the invention.

FIG. 2 is an axial section of the trolling rig shown in FIG. 1.

FIG. 3 is a schematic isometric showing the trolling rig in a partly deployed position.

FIG. 4 is a schematic showing an alternative embodiment of the drive assembly.

DETAILED DESCRIPTION OF THE PREFERRED EMBODIMENT

As best shown in FIG. 2, a trolling rig includes a base 10 which rotatably mounts a crankshaft 12 in suitable journals 13. Preferably, the base includes a cover 14 which houses a pair of drums 16, 18 each holding a suitable weight line 19. Pinned to the crankshaft are handles 20, 22 which are opposed 180° from one another so that when one handle is pushed the other is being pulled for doubling the power applied to the crankshaft. Slidably keyed to each shaft are gears 24, 26 each having circumferentially spaced teeth 27, 28, respectively. As will be described, the gears can be slid axially along the crankshaft into a disengaged position as shown in the left in FIG. 2 and an engaged position as shown in the right in FIG. 2.

Each of the drums is mounted in a drive assembly 30. The drive assemblies are identical so only one will be described. The drive assembly includes a hollow shaft 32 which is rotatably mounted on the crankshaft by a bushing 34. The shaft has a set of circumferentially spaced gear teeth 36 which when meshed with the gear teeth 27 will be rotated by the handle with the crankshaft. Reverse rotation of the countershaft 32 is precluded by a one-way ratchet or overrunning clutch 40. That is, the drive assembly shaft 32 can be rotated in an in-haul direction but is precluded from moving in an out-haul or lowering condition.

In order to allow the drum to rotate in a controlled braked lowering condition or to allow a controlled drag to rotate the drum if the line becomes fouled on the bottom or the like, the drum is held in the drive assembly by a friction drag mechanism. The friction drag mechanism comprises a slip plate 44 which is pressed against the drum by a friction disc 46. The friction disc is pushed against the plate by a threaded star wheel 48. When the star wheel is rotated counterclockwise, the pressure on the friction disc is released 46 so that the drum can rotate either under a fixed resistance or can be free to rotate with a minimum resistance. Both the plate 44 and the friction disc 46 are keyed to the shaft 32 so that when the star drag is tightened, rotation of the drum can occur only when the shaft 32 is rotated as by the handle 20.

The gear 24 is held in an engaged position by a ball or bullet detent 52 which rides in one of two axially spaced grooves in the crankshaft. Thus, when the gear is to be disengaged the gear is pulled sharply so that the gear 24 is shifted outwardly along the shaft with the ball detent 52 riding in the outermost groove in the crankshaft. As is readily apparent, both gears can be engaged with their drums simultaneously or only one of the drums need be engaged but with both handles being usable in either condition for increasing the winching power and speed.

An alternative form is shown schematically in FIG. 4 in which the shaft 12a can move axially to shift handles 20a and 22a and gears 24a and 26a into engagement with the drive assemblies 30. The difference between this and the embodiment of FIGS. 1 and 2 is that in the latter the handles and gears are integral and the shaft 12a slides axially to shift one or the other gears into engagement with a drive assembly.

Pivotally connected to the base 10 is a pair of boom supports 60, 62. Each boom support carries a telescopic boom 64 which preferably is hollow and terminates in a fairlead 66. The boom supports are positionable either in the vertical stored position as shown in the left in FIG. 1 or in the laterally extending use position as shown in the right in FIG. 1. The boom supports are held in these positions by suitable detents not shown. Within each boom support is a sheave 68 whose periphery is generally along the centerline of the pivot axis of the boom support so that line from the drums can be passed through the boom support in either the stored or the extended positions. In the extended positions the booms extend perhaps as much as 10 to 15 feet out from the boat and are supported along their midsections by brackets 70 which are secured to the gunwales of the boom. In this manner a very long boom can be carried by the boat but yet be adequately supported to prevent excessive embodiments of the invention have been illustrated and described, it should be understood that variations will be apparent to one skilled in the art without departing from the principles herein. Accordingly, the invention is not to be limited to the specific embodiment illustrated in the drawing.

I claim:

1. A trolling rig comprising:
a base adapted to be fastened to a boat;
a pair of closely spaced weight line drums rotatably mounted on said base and axially fixed on said base;
a disengageable drive assembly for rotating each drum;
a common crankshaft selectively drivingly engageable with each said drive assembly;
means for rotating said crankshaft;
overrunning clutch means for precluding rotation of said drive assembly in one direction only;
drag means for selectively allowing rotation of a drum relative to the drive assembly in the direction precluded by the overrunning clutch when disengaged and precluding rotation of the drum relative to the drive assembly when engaged; and
means for drivingly coupling said crankshaft to each drive assembly for rotating each of said drums independently of one another, said drag means being located on axially outer sides of said drums externally of both drums for access by the user.

2. The trolling rig of claim 1, said base including a cover enclosing said drums.

3. The trolling rig of claim 1, said base including a pair of boom supports, an extendible boom in each boom support, said boom supports having inner ends aligned with and terminating in closely spaced relationship to the periphery of the respective drums and each containing a line sheave for changing direction of a line on a drum out through said boom, each said boom support being pivotally mounted on said base for positioning said booms selectively laterally in use or vertically when stored out of use.

4. The trolling rig of claim 1, said coupling means including means for selectively driving both of said drums simultaneously.

5. The trolling rig of claim 1, said means for selectively rotating said drums independently of one another including a pair of handles coupled to opposite ends of said crankshaft.

6. A trolling rig comprising:
a base adapted to be fastened to a boat;
a pair of closely spaced weight line drums rotatably mounted on said base and axially fixed on said base;
a disengageable drive assembly for rotating each drum;
a common crankshaft selectively drivingly engageable with each said drive assembly;
means for rotating said crankshaft;
overrunning clutch means for precluding rotation of said drive assembly in one direction only;
drag means for selectively allowing rotation of a drum relative to the drive assembly in the direction precluded by the overrunning clutch when disengaged and precluding rotation of the drum relative to the drive assembly when engaged; and
means for drivingly coupling said crankshaft to each drive assembly for rotating each of said drums independently of one another, said drag means being located on axially outer sides of said drums externally of both drums for access by the user, said means for drivingly coupling the crankshaft to the drive assemblies including handles and mating gear teeth on the handles and drive assemblies, said handles being slidable axially on said crankshaft for selectively engaging said mating gear teeth, and detent means for selectively releasably holding said handles in said teeth engaged positions.

7. The trolling rig of claim 6, said base including a pair of boom supports, a telescopically extendible boom in each boom support, said boom supports being aligned with respective drums and each containing a line sheave for changing direction of a line on a drum out through said boom, each said boom support being rotatably mounted on said base for positioning said booms selectively laterally in use or vertically when stored out of use.

* * * * *